Jan. 28, 1941.  W. HELMORE  2,229,740
AIR SPEED INDICATOR
Filed May 6, 1940

William Helmore
By
Watson, Cole, Grindle & Watson
Attys.

Patented Jan. 28, 1941

2,229,740

UNITED STATES PATENT OFFICE 2,229,740

AIR SPEED INDICATOR

William Helmore, Cambridge, England

Application May 6, 1940, Serial No. 333,695
In Great Britain March 11, 1939

8 Claims. (Cl. 73—182)

This application corresponds to the application of William Helmore, Serial No. 7891/39, which was filed in Great Britain on March 11, 1939.

This invention relates to air speed indicators for aircraft and is concerned with such indicators of the kind in which the change of pneumatic pressure at a Pitot head disposed in the air stream is conveyed to and indicated by a pressure-sensitive instrument remote from the Pitot head, the Pitot head being provided with heating means for the prevention of ice deposits thereon.

In air speed indicators of the kind referred to heat is usually supplied to the Pitot head by passing an electric current through a heater element situated at or in the Pitot head. Normally, the heating means is controlled either manualy by the pilot or by the operation of other electrical apparatus with the result that a considerable wastage of electrical energy takes place from the unnecessary operation of the heater either through the neglect of the pilot or by reason of the operation of the other electrical apparatus when ice is not present. A further disadvantage occurs, when a manual control of the Pitot head heater is employed, owing to the fact that failure by the pilot to put the heater into operation when ice is present may result in incorrect readings of air speed and consequent danger to the aircraft.

The present invention comprises an air speed indicator of the kind referred to wherein the heating means of the Pitot head is controlled by an ice-accretion detector so as to provide heating of the Pitot head only when ice is present. The term "ice accretion detector" is employed herein to designate a device operable in response to the formation of ice, as distinguished from devices which are responsive merely to temperature change.

In one arrangement the ice-accretion detector employed comprises a part disposed in the air stream and having one or more apertures of such size as to be blocked by ice particles to produce a change of pneumatic pressure acting upon a movable member, and according to a further feature of the invention the Pitot head of the air speed indicator is connected to apply an opposing pneumatic pressure on this movable member. The one or more apertures of the ice-accretion detector become blocked by ice particles before the formation of ice can materially affect the Pitot head which is considerably larger in size, so that when ice forms on the detector the balance of pneumatic pressures on the movable member is changed. A bleed passage for the ice-controlled pneumatic pressure acting upon the movable member is conveniently connected to a static head of the indicator.

According to a further feature of the invention electrical heating means of the Pitot head is controlled by the movable member to put the heating means into operation when ice forms at the detector. In one form of the indicator in which an ice-accretion detector is employed having electric heating means for heating that part of the detector disposed in the air stream, the movable member of the detector serves to control both the heating means of the Pitot head and the heating means of the detector. In another form a single heating means is employed for heating both the Pitot head and the part of the ice-accretion detector disposed in the air stream.

The invention also includes an air speed indicator as aforesaid in which the Pitot head and the ice-accretion detector are constructed as a unit device.

Specific embodiments of the invention are shown diagrammatically and by way of example in the accompanying drawing, in which.

Like references indicate like parts in the several figures of the drawing.

Figure 1:
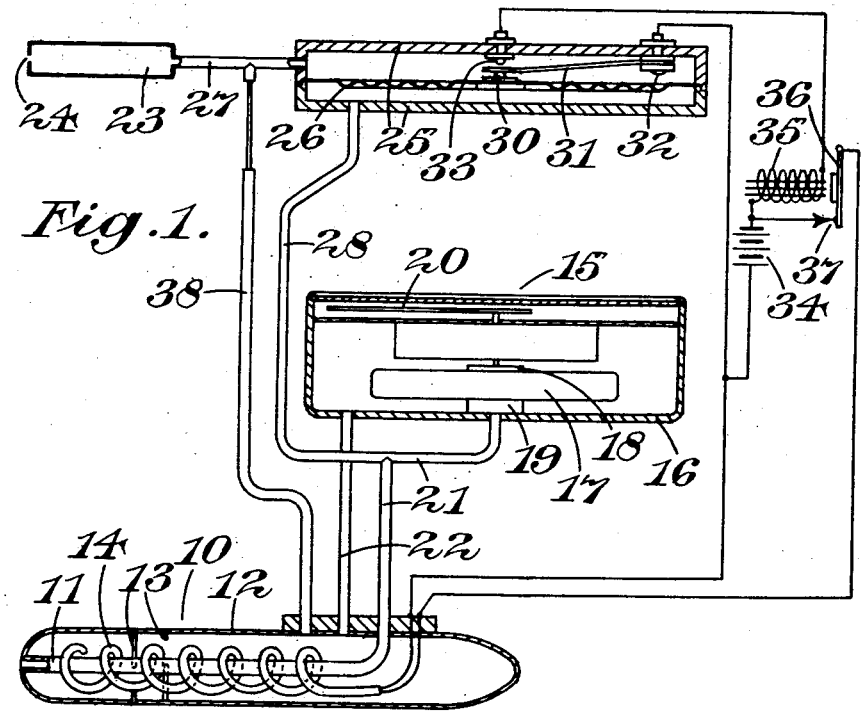
Figure 1 shows an air speed indicator with heating means controlled by a separate ice-accretion detector.

Referring to Figure 1 of the drawing, the air speed indicator comprises a pneumatic pressure head 10 having a Pitot head 11 mounted in an outer casing 12 constituting a static head and for this purpose having lateral openings 13. For preventing ice formation on the Pitot head it is provided with an electrical heating coil 14.

The pneumatic pressure head is associated with a pressure-sensitive indicating instrument 15 having a sealed casing 16 containing a closed collapsible capsule 17 fixed at one side 18 to the casing 16 and having the other, movable side 19 connected to an indicating pointer 20. The Pitot head is connected by a pipe 21 to the capsule 17 and the static head 12 is connected by a pipe 22 to the casing of the instrument.

The ice-accretion detector comprises a tubular part 23 which is placed in the air stream. This part 23 has a small aperture 24 at the front, this aperture being considerably smaller in diameter than the diameter of the Pitot head 11. It is thus very liable to become blocked by ice particles under ice forming conditions.

A two-part casing 25 is divided by a flexible diaphragm 26. The upper part of this casing is connected by a pipe 27 to the tubular part 23 of the ice-accretion detector and the lower part of the casing is connected by a pipe 28 to the Pitot head.

The diaphragm 26 carries a stud 30 arranged to engage the free end of a spring contact 31 secured at its other end to a terminal 32 on the casing 25. The free end of the spring contact 31 is arranged to co-operate with a terminal 33 on the casing, both the terminals 32 and 33 being insulated from the casing.

The terminal 32 is connected to one pole of a battery 34 and to one end of the heating coil 14 of the Pitot head. The other pole of the battery 34 is connected to one terminal of an electro-magnet 35, the other terminal of which is connected to the terminal 33. This electro-magnet controls an armature 36 which on the electro-magnet being energised moves to close contacts 37 to complete a circuit from the battery 34 directly through the heating coil 14.

In operation, and in the absence of ice the pressures at the two sides of the diaphragm 26 will be substantially equal and the free end of the spring contact 31 will be separated from the terminal 33. Immediately ice begins to form it will close the aperture 24 and the pressure in the upper part of the casing 25 will leak away through a pipe 38 connected to the static head 12. The Pitot head will not ice up so readily, due to its larger size, and the pressure applied from the Pitot head to the lower part of the casing 25 will deflect the diaphragm so as to cause the spring contact 31 to engage the terminal 33. A circuit will therefore be completed through the battery 34 and the electro-magnet 35. The electro-magnet 35 being thus energised closes the contacts 37 to complete a circuit through the battery 34 and the heating coil 14 of the Pitot head. The heating of the Pitot head will prevent the formation of ice on it and the heating continues until the atmospheric conditions have caused the disappearance of the ice from the aperture 24 of the detector. It will be appreciated that a plurality of Pitot heads may be similarly linked to an ice-accretion detector for controlling the heating means of the Pitot head.

Figure 3:
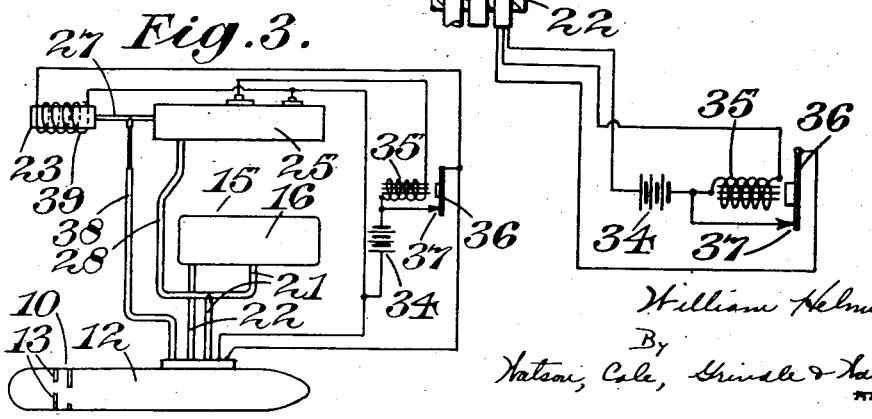
Figure 3 shows a modification of the arrangement shown in Figure 1.

In a modification shown in Figure 3 the part 23 of the ice-accretion detector is provided with a heating coil 39 connected in parallel with the heating coil 14 of the Pitot head 11. When ice forms to close the aperture 24 a circuit will be completed through the coil 39 in addition to the circuit which is completed through the coil 14. The heat produced by the coil 39 will, after a short time, thaw the ice obstructing the aperture 24 so that in consequence the diaphragm 26 will be operated to interrupt the circuit through the electro-magnet 35 and in turn open the circuits of the heating coils 39 and 14. Therefore, under ice forming conditions the heating means for the part 23 of the ice-accretion detector and the heating means for the Pitot head will be intermittently operated, and having regard to this intermittent operation the heating coil 14 will be such as to provide adequate heat to prevent ice formation at the Pitot head.

Figure 2:
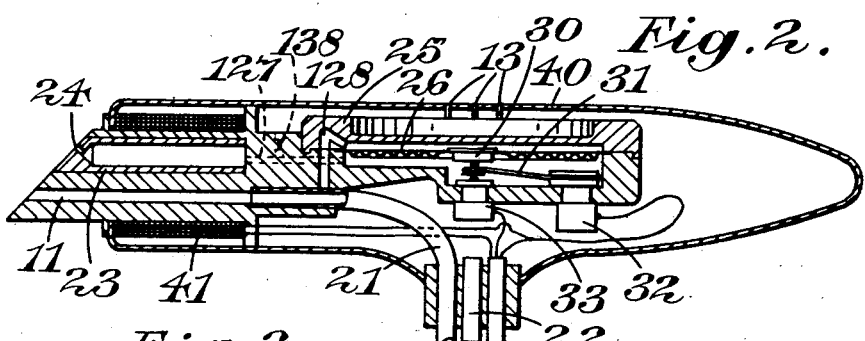
Figure 2 shows a construction of Pitot head and ice-accretion detector for controlling heating of the Pitot head as a unit device.

In the construction shown in Figure 2 the pressure head and the ice-accretion detector are constructed as a single unit. In this construction the Pitot head 11, the part 23 of the ice-accretion detector, with its aperture 24, and the diaphragm 26 with its two-part casing 25 are mounted in a single housing 40 constituting a static head, and for this purpose having the lateral openings at 13. A single electric heating coil 41 is provided around the Pitot head 11 and the part 23 of the ice-accretion detector, the coil being connected in an electric circuit of the same form as that shown in Figure 1. Thus, one end of the coil is connected to the terminal 32 on which the contact spring 31 is mounted, and also to the battery 34, the other end of the coil being connected to the armature 36. The terminal 33 with which the contact spring 31 co-operates is connected to the electro-magnet 35. It will be seen that in this construction the aperture 24 of the ice-accretion detector communicates by a passage 127 with the casing 25 at that side of the diaphragm 26 having the spring contact 31 and the Pitot head 11 communicates by a branch passage 128 with the casing 25 at the other side of the diaphragm 26. A bleed passage 138 is provided between the passage 127 and the static head. The Pitot head 11 and the static head are connected respectively by pipes 21 and 22 to the indicating instrument, as shown in Figure 1.

By means of this invention a considerable economy in electrical energy is secured and the pilot is relieved of any responsibility for the operation of the heating means for the Pitot head. Moreover, the possibility of inaccurate estimation of air speed under ice forming conditions through neglect to put the heating means for the Pitot head into operation, is automatically avoided. Furthermore, with the use of an ice-accretion detector requiring a Pitot pressure a simplification is obtained by deriving this pressure from the Pitot head of the air speed indicator itself.

I claim:

1. An air speed indicator comprising a Pitot head, pressure-sensitive indicating means operated by changes of pneumatic pressure at the Pitot head, heating means for the Pitot head, an ice-accretion detector and means operated by the said detector for controlling said heating means to provide heating of the Pitot head only when ice is present.

2. An air speed indicator comprising a Pitot head, pressure-sensitive indicating means operated by changes of pneumatic pressure at the Pitot head, heating means for the Pitot head, an ice-accretion detector, said detector comprising a part in which a pneumatic pressure is produced and having an aperture which becomes blocked by the ice particles to produce a change of the pneumatic pressure in said part, a pressure movable member and means for applying the pneumatic pressure in said part to the movable member, means for applying the pneumatic pressure at the Pitot head as an opposing pressure on said movable member and means operated by said movable member, to control said heating means so as to provide heating of the Pitot head only when ice is present.

3. An air speed indicator comprising a Pitot head, pressure-sensitive indicating means operated by changes of pneumatic pressure at the Pitot head, electrical heating means for the Pitot head, an ice-accretion detector, said detector comprising a part in which a pneumatic pressure is produced and having an aperture which becomes blocked by the ice particles to produce a change of the pneumatic pressure in said part, a pressure movable member and means for applying the pneumatic pressure in said part to the movable member, means for applying the pneumatic pressure at the Pitot head as an opposing pressure on said movable member and switch means operated by said movable member to control said electrical heating means so as to provide heating of the Pitot head only when ice is present.

4. An air speed indicator comprising a Pitot head, pressure-sensitive indicating means operated by changes of pneumatic pressure at the Pitot head, heating means for the Pitot head, an ice-accretion detector, said detector comprising a part in which a pneumatic pressure is produced and having an aperture which becomes blocked by the ice particles to produce a change of pneumatic pressure in said part, a pressure movable member, means applying the pneumatic pressure in said part to the movable member and heating means for said part of the ice-accretion detector, means for applying the pneumatic pressure at the Pitot head as an opposing pressure on said movable member, and means operated by said movable member to control both the heating means of the Pitot head and the heating means of said part of the ice-accretion detector.

5. An air speed indicator comprising a Pitot head, pressure-sensitive indicating means operated by changes of pneumatic pressure at the Pitot head, an ice-accretion detector, said detector comprising a part in which a pneumatic pressure is produced and having an aperture which becomes blocked by the ice particles to produce a change of the pneumatic pressure in said part, a pressure movable member and means applying the pneumatic pressure to the movable member, means for applying the pneumatic pressure at the Pitot head as an opposing pressure on said movable member, a single electric heating means for heating both the Pitot head and the said part of the ice-accretion detector and means operated by said movable member for controlling said heating means to apply heat only when ice is present at the detector.

6. An air speed indicator comprising a Pitot head, a static head, pressure-sensitive indicating means operated by pneumatic pressures at the Pitot head and static head, heating means for the Pitot head, an ice-accretion detector, said detector comprising a part in which a pneumatic pressure is produced and having an aperture which becomes blocked by the ice particles to produce a change of the pneumatic pressure in said part, a pressure movable member and means for applying the pneumatic pressure in said part to the movable member, means for applying the pneumatic pressure at the Pitot head as an opposing pressure on said movable member, a bleed passage between said part and said static head and means operated by said movable member to control the heating means so as to provide heating of the Pitot head only when ice is present.

7. An air speed indicator having pressure-sensitive indicating means and a unitary operating device therefor, said operating device comprising a Pitot head connected to said indicating means, heating means for the Pitot head, an ice-accretion detector, and means operated by the said detector for controlling said heating means to provide heating of the Pitot head only when ice is present.

8. An air speed indicator comprising a Pitot head, pressure-sensitive indicating means operated by changes of pneumatic pressure at the Pitot head, an ice-accretion detector, a housing carrying said Pitot head and said detector, said detector comprising a part having an aperture which becomes blocked by the ice particles to produce a change of pneumatic pressure in said part and a movable member subjected to said changes of pneumatic pressure in said part, a single electric heating means for heating both the Pitot head and the said part of the ice-accretion detector and means in said housing and operated by said movable member for controlling said heating means to apply heat only when ice is present at the detector.

WILLIAM HELMORE.